United States Patent
Hwang et al.

(10) Patent No.: US 9,699,188 B2
(45) Date of Patent: Jul. 4, 2017

(54) METHOD AND APPARATUS FOR TRANSMITTING AND RECEIVING MESSAGE FOR DOWNLOADABLE CAS OR DRM IN MMT

(71) Applicants: Samsung Electronics Co. Ltd., Suwon-si, Gyeonggi-do (KR); UNIVERSITY OF SEOUL INDUSTRY COOPERATION FOUNDATION, Seoul (KR)

(72) Inventors: Sung-Oh Hwang, Yongin-si (KR); Yong-Han Kim, Seongnam-si (KR); Kyung-Mo Park, Seoul (KR); Sung-Ryeul Rhyu, Yongin-si (KR); Jae-Yeon Song, Seoul (KR)

(73) Assignees: Samsung Electronics Co., Ltd., Suwon-si (KR); University of Seoul Industry Cooperation Foundation, Seoul (KR)

( * ) Notice: Subject to any disclaimer, the term of this patent is extended or adjusted under 35 U.S.C. 154(b) by 0 days.

(21) Appl. No.: 13/875,674

(22) Filed: May 2, 2013

(65) Prior Publication Data

US 2013/0298253 A1 Nov. 7, 2013

Related U.S. Application Data

(60) Provisional application No. 61/641,444, filed on May 2, 2012, provisional application No. 61/671,923, filed on Jul. 16, 2012.

(51) Int. Cl.
H04L 29/06 (2006.01)
H04H 60/23 (2008.01)
(Continued)

(52) U.S. Cl.
CPC ............ *H04L 63/10* (2013.01); *H04H 60/23* (2013.01); *G06F 21/12* (2013.01); *H04H 20/93* (2013.01)

(58) Field of Classification Search
None
See application file for complete search history.

(56) References Cited

U.S. PATENT DOCUMENTS 8,638,818 B2 1/2014 Hwang et al.
2002/0138741 A1* 9/2002 Koch ............................ 713/185
(Continued)

FOREIGN PATENT DOCUMENTS

| KR | 10-2011-0066826 A | 6/2011 |
| KR | 10-2011-0117033 A | 10/2011 |
| KR | 10-2011-0139416 A | 12/2011 |

OTHER PUBLICATIONS

Jeong, et al. A Novel Protocol for Downloadable CAS. IEEE Transactions on Consumer Electronics [online], vol. 54, Issue 3. Aug. 2008 [retrieved on Mar. 16, 2016]. Retrieved from the Internet:< URL: http://ieeexplore.ieee.org/stamp/stamp.jsp?tp=&arnumber=4637612 >.*

(Continued)

*Primary Examiner* — Malcolm Cribbs
(74) *Attorney, Agent, or Firm* — Jefferson IP Law, LLP

(57) ABSTRACT

A method for transmitting and receiving a message for Downloadable-Conditional Access System (D-CAS) or Downloadable-Digital Rights Management (D-DRM) in Moving Picture Experts Group Media Transport (MMT) is provided. The method includes, upon receiving Composition Information (CI) from an MMT server, acquiring signaling information for D-CAS or D-DRM, which is included in the CI, acquiring, from the signaling information, an address of a server from which software of D-CAS or D-DRM is downloadable, generating a request for the soft- (Continued)

ware based on the signaling information, and sending the request for the software to the server address.

9 Claims, 3 Drawing Sheets

(51) Int. Cl.
G06F 21/12 (2013.01)
H04H 20/93 (2008.01)

(56) References Cited

U.S. PATENT DOCUMENTS

| | | |
|---|---|---|
| 2003/0038838 A1* | 2/2003 | Pollitt .......................... 345/741 |
| 2004/0133632 A1* | 7/2004 | Messerges et al. ........... 709/203 |
| 2005/0022033 A1* | 1/2005 | Han .............................. 713/201 |
| 2006/0137015 A1* | 6/2006 | Fahrny ............... H04N 7/17318 726/26 |
| 2008/0098212 A1* | 4/2008 | Helms ................ H04L 63/0428 713/155 |
| 2008/0288784 A1* | 11/2008 | Lee et al. ..................... 713/189 |
| 2009/0150552 A1 | 6/2009 | Kim et al. |
| 2009/0151003 A1 | 6/2009 | Moon et al. |
| 2010/0153711 A1* | 6/2010 | Koo .................. H04L 63/0823 713/156 |
| 2010/0161966 A1 | 6/2010 | Kwon et al. |
| 2011/0107081 A1* | 5/2011 | Oh et al. ....................... 713/150 |
| 2011/0208829 A1 | 8/2011 | Kwon et al. |
| 2011/0231870 A1* | 9/2011 | Hartung ............. H04N 21/4345 725/25 |
| 2011/0239287 A1* | 9/2011 | Pak et al. ........................ 726/10 |
| 2012/0079528 A1* | 3/2012 | Trimper et al. .................. 725/31 |
| 2012/0090034 A1* | 4/2012 | Kang et al. ..................... 726/26 |
| 2012/0090036 A1* | 4/2012 | Kang et al. ..................... 726/27 |
| 2013/0097627 A1* | 4/2013 | Hwang .................. H04H 60/73 725/25 |
| 2013/0219510 A1* | 8/2013 | Seleznev ................ G06F 21/10 726/27 |
| 2013/0276015 A1* | 10/2013 | Rothschild et al. ............ 725/25 |

OTHER PUBLICATIONS

Sung Oh Hwang, EE participants, "Report on MMT EE#13, CI-Layer Downloadable CAS/DRM, MMT EE #13 Participants", Nov. 2011, Geneva Switzerland, XP030050136.

Gererd Fernando, Kyungno Park, Jin Lee, "Technologies under Consideration (TuC) for MMT", Jul. 2011, Torino, Italy, XP030018665.

AHG on MMT, Review of c11792, International Organisation for Standardisation, ISO/IEC JTC1/SC29/WG11 m 19989, Mar. 2011, Geneva, Switzerland.

* cited by examiner

METHOD AND APPARATUS FOR TRANSMITTING AND RECEIVING MESSAGE FOR DOWNLOADABLE CAS OR DRM IN MMT

PRIORITY

This application claims the benefit under 35 U.S.C. §119(e) of a U.S. provisional patent application filed on May 2, 2012 in the United States Patent and Trademark Office and assigned Ser. No. 61/641,444, and a U.S. Provisional application filed in the United States Patent and Trademark Office on Jul. 16, 2012 and assigned Ser. No. 61/671,923, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co., Ltd., and University of Seoul Industry Cooperation Foundation.

BACKGROUND OF THE INVENTION

1. Field of the Invention

The present invention relates to a message format for signaling downloadable Conditional Access System (CAS) or Digital Rights Management (DRM) in Moving Picture Experts Group Media Transport (MMT), and a method and apparatus for transmitting and receiving the same.

2. Description of the Related Art

In recent years, the Moving Picture Experts Group (MPEG) has been proceeding with the standardization of MPEG-H, which is the multimedia coding representation and multiplexing delivery standard that is to be used in the Ultra-High-Definition TV (UHDTV) era. Similar to the legacy systems such as MPEG-1, MPEG-2 and MPEG-4, MPEG-H is expected to be published as a set of standards that is composed of systems such as part-1 system, part-2 video, and part-3 audio. Part 1 of MPEG-H is an MPEG Media Transport (MMT). The MMT is the next-generation multimedia multiplexing delivery standard, which is being standardized in MPEG as a follow-up of the MPEG-2 Transport Stream (TS) standard. MMT is Internet Protocol (IP)-friendly, and aims at multimedia delivery in which various types of channels are used in combination.

In this MMT, Conditional Access System (CAS) and Digital Rights Management (DRM) are used to protect MMT assets and MMT packages. MMT may also support Downloadable-CAS (D-CAS) and Downloadable-DRM (D-DRM). In addition, in MMT, there are a variety of ways to utilize not only CAS and DRM, but also D-CAS and D-DRM.

Currently, however, MMT merely defines only the message needed to signal DRM and CAS. Therefore, there is a need for a message format for signaling D-CAS and D-DRM in MMT.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a message format for signaling Downloadable-Conditional Access System (D-CAS) and Downloadable-Digital Rights Management (D-DRM) in Moving Picture Experts Group Media Transport (MMT).

Another aspect of the present invention is to provide a method and apparatus for transmitting and receiving a message for signaling D-CAS and D-DRM in MMT.

In accordance with an aspect of the present invention, a method for transmitting and receiving a message for D-CAS or D-DRM in MMT is provided. The method includes, upon receiving Composition Information (CI) from an MMT server, acquiring signaling information for D-CAS or D-DRM, which is included in the CI, acquiring, from the signaling information, an address of a server from which software of D-CAS or D-DRM is downloadable, generating a request for the software based on the signaling information, and sending the request for the software to the server address.

In accordance with another aspect of the present invention, a method for transmitting and receiving a message for D-CAS or D-DRM in MMT is provided. The method includes signaling, to a second layer, signaling information for D-CAS or D-DRM in CI by means of a first layer, and transmitting the CI to an MMT client by means of a third layer.

In accordance with another aspect of the present invention, a client for transmitting and receiving a message for D-CAS or D-DRM in MMT is provided. The client includes a controller for, upon receiving CI from an MMT server by a transceiver, acquiring signaling information for D-CAS or D-DRM, which is included in the CI, acquiring, from the signaling information, an address of a server from which software of D-CAS or D-DRM is downloadable, generating a request for the software based on the signaling information, and controlling the transceiver to send the request for the software to the server address.

In accordance with yet another aspect of the present invention a server for transmitting and receiving a message for D-CAS or D-DRM in MMT is provided. The server includes a controller for signaling, to a second layer, signaling information for D-CAS or D-DRM in CI by means of a first layer, and controlling a transceiver to transmit the CI to an MMT client by means of a third layer.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a specific message format for signaling Downloadable-Digital Rights Management (D-DRM) and Downloadable-Conditional Access System (D-CAS) in Moving Picture Experts Group Media Transport (MMT).

For reference, CAS is configured such that, in order to use it, a user needs to scramble content and pay for the content using a smart card or a cable card, and it may be construed as a path between a server providing the content and a client receiving the content. DRM, Internet-based technology capable of two-way communication, encrypts data of digital content so that only the authorized user and terminal may decrypt the data. In other words, DRM is technology for preventing content in a device from being leaked to the outside when it is delivered to a client.

Figure 1:
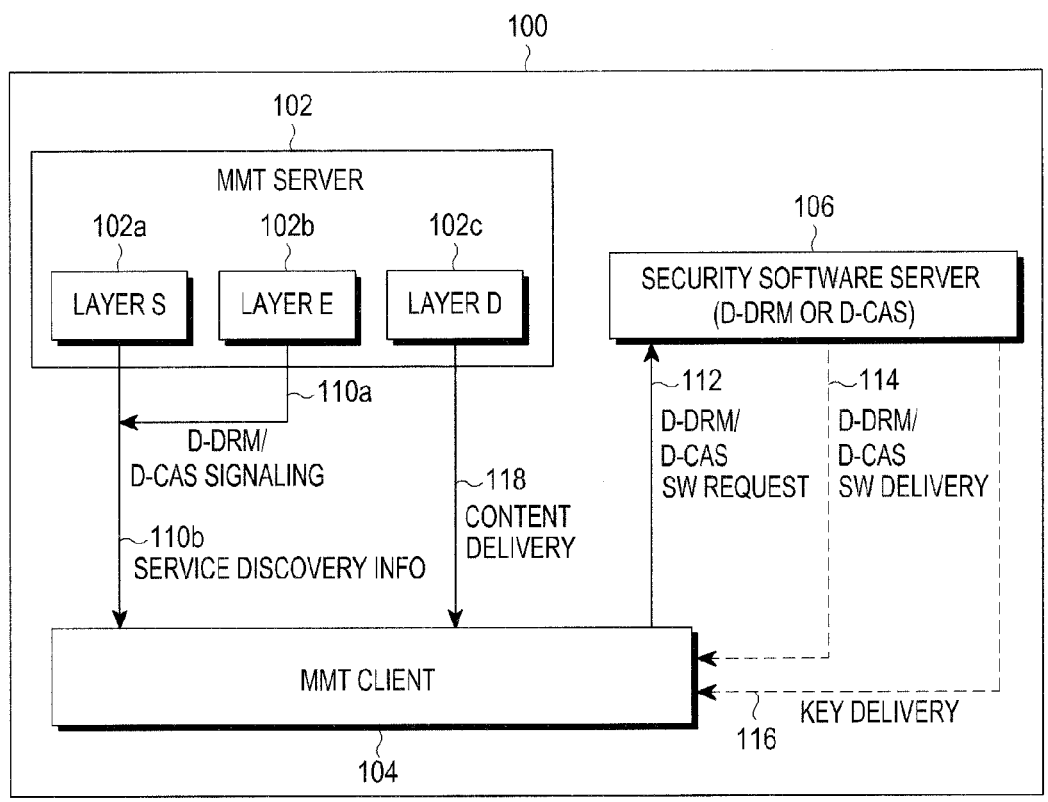
FIG. 1 illustrates an operation of Downloadable-Digital Rights Management (D-DRM) and Downloadable-Conditional Access System (D-CAS) in an Moving Picture Experts Group Media Transport (MMT) system according to an exemplary embodiment of the present invention.

FIG. 1 illustrates an operation of D-DRM and D-CAS in an MMT system according to an exemplary embodiment of the present invention.

Referring to FIG. 1, an MMT system 100 includes, for example, an MMT server 102, an MMT client 104, and a security software server 106. The security software server 106 is a logical entity corresponding to D-DRM or D-CAS, and is assumed to be situated outside the MMT server 102. In an alternative exemplary embodiment, however, the security software server 106 may exist in the MMT server 102, or in another physical entity.

The MMT server 102 includes a total of three layers: a layer S (for Signaling) 102a, a layer E (for Encryption) 102b and a layer D (for Delivery) 102c. The layer S 102a and the layer E 102b may configure a message, and the layer D 102c may deliver the message.

In the above-described exemplary MMT system 100, a proposed signaling procedure for D-DRM and/or D-CAS may be performed as follows.

In step 110a, the MMT server 102 performs D-CAS/D-DRM signaling to the layer S 102a by means of the layer E 102b. In other words, the layer E 102b provides D-DRM/D-CAS information to the layer S 102a. The D-DRM/D-CAS information may be included in Composition Information (CI) that is defined according to exemplary embodiments of the present invention. The CI includes DRM/CAS information which is used for MMT assets and MMT packages according to exemplary embodiments of the present invention. For example, the DRM/CAS information may include the CAS and DRM solution and the server address.

In step 110b, the MMT server 102 delivers service discovery information including the CI to the MMT client 104 by means of the layer E 102b. The service discovery information includes the type, location and security information of the content provided by the MMT server 102. The CI, as the security information, may be included in the service discovery information.

The MMT server 102 may also compose a separate message in 51 layer by separating the CI message from the service discovery information, and deliver it to the MMT client 104 by means of the layer E 102c. The CI may further include an encryption instruction for MMT packages and MMT assets.

Table 1 below illustrates an example of a CI message format according to an exemplary embodiment of the present invention.

TABLE 1

| NAME | LEVEL | DESCRIPTION | DATA TYPE |
| --- | --- | --- | --- |
| securityInfo | 1 | Provides the information of security solution. | |
| Type | 2 | 0: CAS<br>1: DRM<br>2: Downloadable CAS<br>3: Downloadable DRM<br>4~7: reserved for the future use | unsignedByte |
| Solution | 3 | Name of Security Solution [Note: we can use the different format if we will have the registration scheme] | anyURI [unsignedByte] |
| serverAddress | 3 | Address of Server where MMT client get all security material for type 0 and 1 Address of Server where MMT client can download SW for DRM or CAS for type 2 and 3. | anyURI |

Referring to Table 1, the CI message, according to an exemplary embodiment of the present invention, includes information corresponding to each of, for example, security information 'securityInfo', type 'Type', solution 'Solution' and server address 'serverAddress'.

The 'securityInfo' indicates that information about a security solution is provided. The 'securityInfo' may be expressed in binary form, and may be represented as, for example, 'Security_descriptor' in Table 2 below.

Table 2 illustrates an example of the 'Security_descriptor' indicating the 'securityInfo' proposed by an exemplary embodiment of the present invention.

TABLE 2

| SYNTAX | VALUE | NO. OF BITS | FORMAT |
|---|---|---|---|
| Security_descriptor( ) { | | | |
|     descriptor_tag | | 16 | uimsbf |
|     descriptor_length | | 16 | uimsbf |
|     Security_type | | 8 | uimsbf |
|     If(security_type = access control){ | | | |
|         Solution | | | |
|         Access_control_server_address { | | | |
|         } | | | |
|     } | | | |
|     Else if(security_type = DRM){ | | | |
|         Solution | | | |
|         DRM_server_address { | | | |
|         } | | | |
|     } | | | |
|     Else if(security_type = DCAS){ | | | |
|     DCAS_server_address { | | | |
|     } | | | |
|     } | | | |
|     Else if(security_type = DDRM){ | | | |
|     DDRM_server_address { | | | |
|     } | | | |
|     } | | | |
| } | | | |

Referring to Table 2, the 'Security_descriptor' is used to specify a security system that can be used to protect MMT assets or MMT packages. The 'Security_descriptor' may be periodically delivered in a security message or an Information-on-Tables and Notices (ITN) message. For reference, the ITN message may include an ITN table and other tables that can be used for high-speed access to packages. ITN is similar to that of MPEG-2 in terms of its role, but has other specific functions for MMT. The ITN table includes full information about all other 51 tables. In addition, ITN has information about reception of a notice, and typical examples of the notice may include an emergency alarm, emergency notification and the like.

The 'Security_descriptor' may include the following syntaxes:

'descriptor_tag': indicates a tag value indicating a type of a descriptor.

'descriptor_length': indicates a length in bytes counted starting from the next byte following a field corresponding to the 'descriptor_length' up to the last byte of the 'Security_descriptor'.

'Security_type': indicates the type of the security solution, i.e., indicates a solution for access control, DRM, D-CAS or D-DRM.

'Solution': indicates which security solution is used for access control, DRM, D-CAS or D-DRM.

'Access_control_server_address': indicates an address of an access control security solution server in which a client is authenticated and authorized.

'DRM_server_address': indicates an address of a DRM solution server in which a client is to be authenticated and authorized.

'DCAS_server_address': indicates an address of a D-CAS server from which an authenticated and authorized client may download D-CAS software.

'DDRM_server_address': indicates an address of a D-DRM server from which an authenticated and authorized client may download D-DRM software.

In Table 1, 'Type' may indicate any of 5 types, and may be expressed in, for example, binary form. More specifically, 'Type' indicates CAS if its value is '0', indicates DRM, if its value is '1', indicates D-CAS if its value is '2', indicates D-DRM if its value is '3', and indicates a value reserved for future use if its value is '4' to '7'.

In Table 1, 'Solution' indicates a name of a security solution, and it may be represented as, for example, an arbitrary Uniform Resource Identifier (URI). Depending on its method of registration, 'Solution' may be used in another format.

In Table 1, 'serverAddress' may indicate an address of a server from which an MMT client may acquire all security elements if a value of the 'Type' is '0' and '1', i.e., for CAS and DRM. In addition, 'serverAddress' may indicate an address of a server that provides software downloadable by an MMT client, if a value of the 'Type' is '2' and '3', i.e., for D-CAS and D-DRM.

Notably, exemplary embodiments of the present invention are not concerned with how specific DRM solution and CAS solution are associated with MMT.

In an exemplary implementation, after step 110b, the MMT client 104 has acquired an address of, for example, the security software server 106 based on the received CI. In step 112, the MMT client 104 sends a 'D-CAS/D-DRM software request' message to the security software server 106 corresponding to the address. The 'D-CAS/D-DRM software request' message is sent for access to the security software server 106 to download D-CAS software or D-DRM software having validity information of the MMT client 104, which was acquired from, for example, the CI. The 'D-CAS/D-DRM software request' message includes, for example, validity information of the MMT client 104, and validity information, acquired from the CI, of the right of the MMT client 104 to install D-CAS/D-DRM software. A token may be used for the validity information of the right of the MMT client 104. Although not illustrated in FIG. 1, the MMT client 104 needs to perform a procedure for acquiring the token from a token issuer (not shown) in advance in order to access the security software server 106. The 'D-CAS/D-DRM software request' message needs to be standardized to ensure compatibility between MMT and D-CAS/D-DRM solution. Table 3 below illustrates an example of a message format of a 'D-CAS/D-DRM software request' message according to an exemplary embodiment of the present invention.

TABLE 3

| NAME | LEVEL | CATEGORY | DESCRIPTION | DATA TYPE |
|---|---|---|---|---|
| version | 1 | Mandatory (1) | Indicates Message Version. MMT client may update message when it continuously communicates to Server. For instance, MMT client can work under two difference devices. | unsignedInteger |

TABLE 3-continued

| NAME | LEVEL | CATEGORY | DESCRIPTION | DATA TYPE |
|---|---|---|---|---|
| length | 1 | Mandatory(1) | Indicates the length of Message | unsignedByte |
| tokenID | 1 | Mandatory(1) | Identification of Token and is provided by Token Provider. Token should be provided by a trustable entity. It has sub elements of Device ID, Token Issuer ID, Token Issuer Address, Issue Time and Expire Time | anyURI |
| deviceID | 2 | Mandatory(1 to N) | It provides identification of device(s) under Token. If MMT client wants to consume MMT Asset/Package in two different devices, then multiple Device ID should be provided. | TBD |
| tokenIssuerID | 2 | Mandatory(1) | Identification of trust entity that issues a token. This field is to be used by D-CAS/D-DRM server to verify the validity of Token. | anyURI |
| tokenIssuerAddress | 2 | Mandatory(1) | Address of token Issuer server. Download DRM/CAS server can use this address for the verification of the device having MMT client if necessary. Note: Server to server communication for device verification is out of scope. | anyURI |
| tokenIssueTime | 2 | Mandatory(1) | A time at which the Token is issued. The unit of this field is seconds. NTC format will be used. | Decimal |
| tokenExpireTime | 2 | Mandatory(1) | A time at which the Token is expired. The unit of this field is seconds. NTC format will be used. | Decimal |
| contentInfo | 1 | Optional(0 to 1) | This field provides the information of MMT Package/Assent to be decrypted by downloaded DRM and CAS. It has contentListType, packageID and assetID as sub-field. | |
| contentListType | 2 | Mandatory(1) | 0: all MMT packages/Assets to be consumed by MMT client 1: package 2: Asset 3~7: reserved for future use | UnsignedByte |
| packageID | 3 | Optional(0 to n) | Provides the ID of packages to be decrypted by downloaded DRM and/or CAS. This field should be present if the value of contentListType is 1. | anyURI |
| assetID | 3 | Optional(0 to n) | Provides the ID of assets to be decrypted by downloaded DRM and/or CAS. This field should be present if the value of contentListType is 2. | anyURI |
| swDownloadServerInfo | 1 | Mandatory(1) | It provides address of Server where MMT client can download DRM SW and/or CAS SW. It has two different address types. One is IP and the other is URL. At least one of them shall be given. | |

TABLE 3-continued

| NAME | LEVEL | CATEGORY | DESCRIPTION | DATA TYPE |
|---|---|---|---|---|
| ipAddress | 2 | Optional(0 to 1) | IP address of Server. | String |
| portNumber | 3 | Optional(0 to 1) | Port number in the above IP address of Server. | Unsigned Int |
| URL | 2 | Optional (0 to 1) | URL of Server | anyURI |
| signatureInfo | 1 | Mandatory(1) | This field gives the information of signature to verify this message. | |
| signatureAlgorithm | 2 | Mandatory(1) | It provides signature generation algorithm. [Note] we can restrict the number of algorithms. For this case, unsigned Byte is enough for data type. | String[Unsigned Int] |
| signatureData | 2 | Mandatory(1) | It provides the signature data. | char |

Referring to Table 3, the 'D-CAS/D-DRM software request' message may include, for example, the following information.

In Table 3, 'Version' indicates a message version. For example, the MMT client 104 may update the 'D-CAS/D-DRM software request' message if it continuously communicates with the security software server 106. For example, the MMT client 104 may operate under two different devices.

In Table 3, 'Length' indicates a length of the 'D-CAS/D-DRM software request' message.

In Table 3, 'tokenID' indicates an identifier of a token provided by a token issuer. The token needs to be provided by a reliable entity. The 'tokenID' includes sub elements to be described below. The sub elements include 'tokenIssuerID', 'tokenIssueTime' and 'tokenExpireTime', and the like. Substantially, the 'tokenID' indicates reliability information in a device using a 'D-CAS/D-DRM software, whether it is alright to deliver the D-DRM/D-CAS software to the device. In accordance with an exemplary embodiment of the present invention, upon detecting that an error doesn't included in reliability and integrity of the 'tokenID' obtained from the 'D-CAS/D-DRM software request' message, an arbitrary security software server may determine to deliver the D-DRM/D-CAS software corresponding to the 'D-CAS/D-DRM software request' message to the MMT client, can trust the 'D-CAS/D-DRM software request' message. In an alternative exemplary embodiment, upon detecting the 'tokenID' from the 'D-CAS/D-DRM software request' message, the security software server may select D-CAS or D-DRM mapped to the 'tokenID' and deliver D-CAS or D-DRM software corresponding to the selected D-CAS or D-DRM to the MMT client.

In Table 3, 'deviceID' indicates an identifier of a device(s) that is based on the corresponding token. If it is assumed that the MMT client wants to use MMT assets/packages in two different devices, a multi-device ID will be provided.

In Table 3, 'tokenIssuerID' indicates an identifier of a reliable entity issuing a token, i.e., a token issuer and is used by the security software server to check the validity of the token corresponding to the 'tokenID'.

In Table 3, 'tokenIssuerAddress' indicates an address of a token issuer. Upon receiving the 'D-CAS/D-DRM software request' message, the security software server may use 'tokenIssuerAddress' to identify a device having an MMT client, if necessary.

In Table 3, 'tokenIssueTime' indicates a time at which the token corresponding to 'tokenID' is issued. The unit of the time may be, for example, 'second', and a Network Transmission Committee (NTC) format may be used.

In Table 3, 'tokenExpireTime' indicates a time at which the token corresponding to 'tokenID' expires. The unit of the time may be, for example, 'second', and an NTC format may be used.

In Table 3, 'contentInfo' indicates information that can be optionally inserted and provides information about MMT packages/assets, which corresponds to the content to be described by D-DRM and D-CAS. Also, 'contentInfo' includes sub fields including the below-described 'contentListType', 'packageID' and 'assetID'.

In Table 3, 'contentListType' may be represented in a total of 4 values and indicates all MMT packages/assets to be used by the MMT client, if its value is '0'. In an exemplary implementation, 'contentListType' indicates an MMT package if its value is '1', indicates an MMT asset if its value is '2', and indicates a value reserved for future use, if its value is '3' to '7'.

In Table 3, 'packageID' is information that can be optionally inserted and provides an ID of packages to be decrypted by D-CAS and/or D-DRM. In an exemplary embodiment, 'packageID' should necessarily exist if a value of the 'contentListType' is '1'.

In Table 3, 'assetID' is also the information that can be optionally inserted and provides an ID of assets to be decrypted by D-CAS and/or D-DRM. In an exemplary embodiment, 'assetID' should necessarily exist if a value of the 'contentListType' is '2'.

In Table 3, 'swDownloadServerInfo' provides an address of a server from which an MMT client may download D-DRM software (SW) and/or D-CAS SW, for example, provides an address of the security software server 106 in FIG. 1. The 'swDownloadServerInfo' has two different address types: one is IP and another is Uniform Resource Locator (URL). At least one of the two different address types should be given.

In Table 3, 'ipAddress', as information that can be optionally inserted, indicates an IP address of a server from which an MMT client may download D-DRM SW and/or D-CAS SW, for example, indicates an IP address of the security software server 106 in FIG. 1.

In Table 3, 'portNumber', as information that can be optionally inserted, indicates a port number in the IP address of a server from which an MMT client may download D-DRM SW and/or D-CAS SW, for example, the IP address of the security software server 106 in FIG. 1.

In Table 3, 'URL', also as information that can be optionally inserted, indicates a URL of a server from which an MMT client may download D-DRM SW and/or D-CAS SW, for example, indicates a URL of the security software server 106 in FIG. 1.

In Table 3, 'signatureInfo' provides signature information used to check the 'D-CAS/D-DRM software request' message.

In Table 3, 'signatureAlgorithm' provides a signature generation algorithm. It should be noted that the number of algorithms may be restricted. In this case, 'unsigned Byte' is enough for data type.

In Table 3, 'signatureData' provides signature data.

Thereafter, in step 114, the security software server 106 sends D-CAS/D-DRM software corresponding to the 'D-CAS/D-DRM software request' message to the MMT client 104. When sending the D-CAS/D-DRM software, the security software server 106 may use, for example, a Hyper Text Transfer Protocol (HTTP) based on the Internet Protocol (IP), or may use a broadcast channel. However, the broadcast channel is vulnerable to security.

In step 116, the security software server 106 delivers the keys corresponding to the sent D-CAS and/or D-DRM software to the MMT client 104. More specifically, if DRM software is delivered to the MMT client 104, right objects and security keys are delivered to the MMT client 104. If CAS software is delivered to the MMT client 104, encryption keys are delivered to the MMT client 104. CAS and DRM solutions may be defined in their own ways for delivery of security elements, so they may be defined out of the MMT scope.

In step 118, the MMT server 102 installs the D-DRM/D-CAS software using the keys and delivers content in the form of an MMT asset or an MMT package to the MMT client 104 by means of the layer D 102c.

Figure 2:
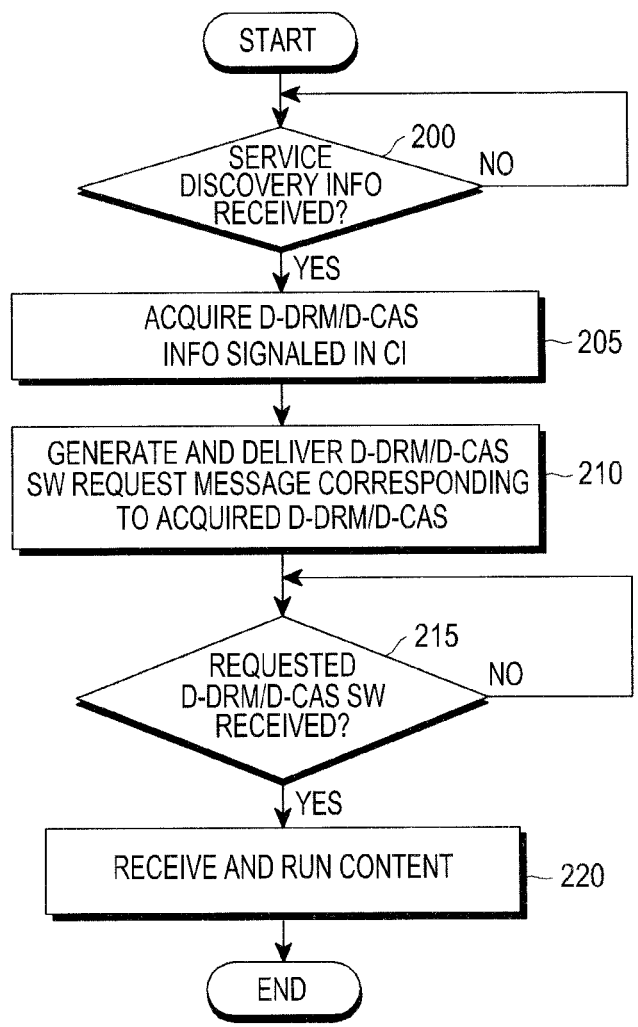
FIG. 2 is a flowchart illustrating an operation of an MMT client according to an exemplary embodiment of the present invention.

FIG. 2 is a flowchart illustrating an operation of an MMT client according to an exemplary embodiment of the present invention.

Referring to FIG. 2, the MMT client determines whether service discovery information is received from an MMT server in step 200. If no service discovery information is received, the MMT client waits until the service discovery information is received.

Upon receiving the service discovery information, the MMT client acquires D-DRM/D-CAS information signaled in the CI that is included in the service discovery information, in step 205. The D-DRM/D-CAS information may be included, for example, in the CI corresponding to the message format illustrated in Table 1.

In step 210, the MMT client generates a 'D-CAS/D-DRM software request' message based on the D-DRM/D-CAS information acquired from the CI, and sends it to a server corresponding to the D-DRM/D-CAS information, for example, to the security software server. The 'D-CAS/D-DRM software request' message may be generated to correspond to the message format illustrated in, for example, Table 3. A detailed description thereof will be omitted.

The MMT client determines in step 215 whether D-CAS/D-DRM software corresponding to the 'D-CAS/D-DRM software request' message is received from the security software server. If the D-CAS/D-DRM software is not received, the MMT client continuously waits for reception of the D-CAS/D-DRM software.

Upon receiving the D-CAS/D-DRM software, the MMT client installs the D-CAS/D-DRM software received from the security software server, receives the content it has requested in advance, from the MMT server, and runs the content with the installed D-CAS/D-DRM software, in step 220. The content is received in the form of an MMT asset or an MMT package.

Figure 3:
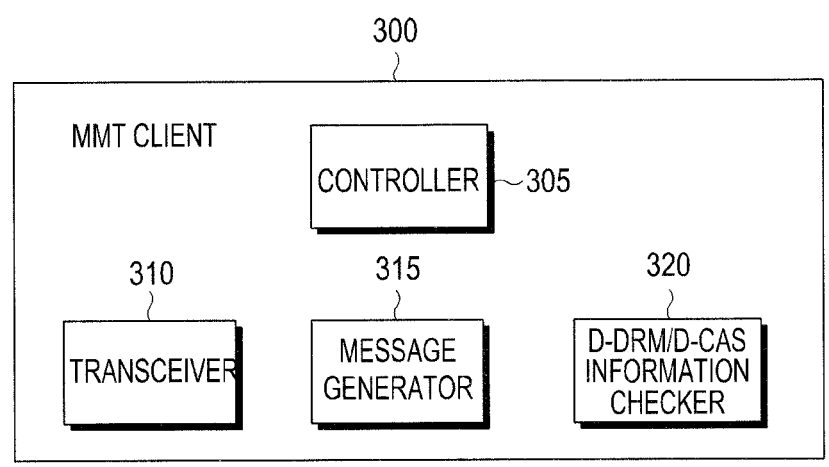
FIG. 3 is a block diagram of an MMT client according to an exemplary embodiment of the present invention.

FIG. 3 is a block diagram of an MMT client according to an exemplary embodiment of the present invention.

Referring to FIG. 3, an MMT client 300 includes a controller 305, a transceiver 310, a message generator 315, and a D-CAS/D-DRM information checker 320.

Upon recognizing that the transceiver 310 receives service discovery information from an MMT server, the controller 305 controls the D-CAS/D-DRM information checker 320 to acquire the D-DRM/D-CAS information signaled in the CI that is included in the service discovery information. The D-DRM/D-CAS information may be included in the CI corresponding to the message format illustrated in, for example, Table 1. A detailed description thereof will be omitted.

The controller 305 controls the message generator 315 to generate a 'D-CAS/D-DRM software request' message based on the D-CAS/D-DRM information acquired from the CI. The 'D-CAS/D-DRM software request' message may be generated to correspond to the message format illustrated in, for example, Table 3. A detailed description thereof will be omitted. The controller 305 controls the transceiver 310 to send the 'D-CAS/D-DRM software request' message to the security software server.

Thereafter, upon detecting that the transceiver 310 receives the D-CAS/D-DRM software corresponding to the 'D-CAS/D-DRM software request' message from the security software server, the controller 305 installs the D-CAS/D-DRM software using the keys that it has acquired from the security software server.

Thereafter, the transceiver 310 receives content in the form of an MMT asset or an MMT package from the MMT server.

As is apparent from the foregoing description, exemplary embodiments of the present invention provide a format of a message for signaling D-CAS/D-DRM and a method and apparatus for sending and receiving the message in MMT, thereby making it possible to efficiently signal the D-CAS/D-DRM in MMT.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving media data at a client device in a multimedia system, the method comprising:
   receiving, from a server, a signaling message comprising security information and encryption indication information, the security information comprising at least an indication of security software, wherein the security software is at least one of a downloadable conditional access system (CAS) security software and a downloadable digital rights management (DRM) security software;
   transmitting, to a security entity, a security software request message comprising authentication information of the client device and the security information;
   receiving, from the security entity, the downloadable CAS security software when the indication of the security information indicates downloadable CAS security software;

receiving, from the security entity, the downloadable DRM security software when the indication of the security information indicates downloadable DRM security software;

receiving, from the server, at least one of a service component and a service package, and decrypting the at least one of the service component and the service package according to an indication of the encryption indication information using the received security software, wherein the service package comprises at least one service component and information related to delivery of the at least one service component, and the service component is corresponding to the media data, the media data comprising at least one media data item having a same media data identifier.

2. The method of claim 1, wherein the security entity is included in the server.

3. The method of claim 1, wherein the security software request message further comprises at least one of at least one device identifier (ID) indicating identification of at least one device using the authentication information, and information related to the at least one of a plurality of service components and a plurality of service packages to be descripted by the downloadable CAS or the downloadable DRM.

4. The method of claim 1, wherein the security software request message further comprises at least one of version information and length of the security software request message, identification of an entity to issue the authentication information, and time information at which the authentication information is issued or expired.

5. The method of claim 1, wherein if the encryption indication information indicates encryption of the service component, the encryption indication information further includes type information of the encryption indication information, a length information indicating bytes counting from next bytes after the length information to a last byte of the encryption indication information.

6. A client device for receiving media data in a multimedia system, the client device comprising:
   a transceiver configured to:
   receive from a server, a signaling message comprising security information and encryption indication information, the security information comprising at least an indication of security software, wherein the security software is at least one of a downloadable conditional access system (CAS) security software and a downloadable digital rights management (DRM) security software, transmit, to a security entity, a security software request message comprising authentication information of the client device and the security information, receive, from the security entity, the downloadable CAS security software when the indication of the security information indicates downloadable CAS security software, receiving, from the security entity, the downloadable DRM security software when the indication of the security information indicates downloadable DRM security software, and receive, from the server, at least one of a service component and a service package; and a processor configured to, if at least one of a service component and a service package is received from the server, decrypt the at least one of the service component and the service package according to an indication of the encryption indication information using the received security software, wherein the service package comprises at least one service component and information related to delivery of the at least one service component, and the service component is corresponding to the media data, the media data comprising at least one media data item having a same media data identifier.

7. The client device of claim 6, wherein the security entity is included in the server.

8. The client device of claim 6, wherein the security software request message further comprises at least one of at least one device identifier (ID) indicating identification of at least one device using the authentication information, and information related to at least one of a plurality of service components and a plurality of service packages to be descripted by the downloadable CAS or the downloadable DRM.

9. The client device of claim 6, wherein the security software request message further comprises at least one of version information and length of the security software request message, identification of an entity to issue the authentication information, and time information at which the authentication information is issued or expired.

* * * * *